US012720556B2

(12) United States Patent
Singh et al.

(10) Patent No.: US 12,720,556 B2
(45) Date of Patent: Aug. 25, 2026

(54) COMMUNICATION SYSTEM

(71) Applicant: NEC Corporation, Tokyo (JP)

(72) Inventors: Jagdeep Ahluwalia Singh, Surrey (GB); Yuhua Chen, Surrey (GB); Maxime Grau, Surrey (GB); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 731 days.

(21) Appl. No.: 18/027,703

(22) PCT Filed: Sep. 27, 2021

(86) PCT No.: PCT/JP2021/035363
§ 371 (c)(1),
(2) Date: Mar. 22, 2023

(87) PCT Pub. No.: WO2022/065481
PCT Pub. Date: Mar. 31, 2022

(65) Prior Publication Data

US 2023/0389081 A1 Nov. 30, 2023

(30) Foreign Application Priority Data

Sep. 28, 2020 (GB) ..................................... 2015341

(51) Int. Cl.
*H04W 72/23* (2023.01)
*H04W 74/04* (2009.01)
(Continued)

(52) U.S. Cl.
CPC ........... *H04W 72/23* (2023.01); *H04W 74/04* (2013.01); *H04W 76/27* (2018.02); *H04W 74/0833* (2013.01); *H04W 74/0836* (2024.01)

(58) Field of Classification Search
CPC .. H04W 74/0833; H04W 72/23; H04W 74/04
See application file for complete search history.

(56) References Cited

U.S. PATENT DOCUMENTS

2019/0289660 A1 9/2019 Yi et al.
2020/0196349 A1* 6/2020 He .................... H04W 72/1268
(Continued)

FOREIGN PATENT DOCUMENTS

JP 2019-186674 A 10/2019
JP 2019-533374 A 11/2019
(Continued)

OTHER PUBLICATIONS

International Search Report for PCT Application No. PCT/JP2021/035363, mailed on Jan. 5, 2022.
(Continued)

*Primary Examiner* — Siren Wei

(57) ABSTRACT

A system is disclosed in which a user equipment (UE) performs small data transmission procedure in Radio
(Continued)

Resource Control (RRC) Inactive state using a configured grant or random access. As part of this procedure, the UE receives configuration information for controlling subsequent small data transmissions. For example, the configuration information may be used to re-activate, re-configure, or release a configured grant stored by the UE.

10 Claims, 8 Drawing Sheets

(51) Int. Cl.
*H04W 76/27* (2018.01)
*H04W 74/0833* (2024.01)
*H04W 74/0836* (2024.01)

(56) References Cited

U.S. PATENT DOCUMENTS

2021/0068164 A1 3/2021 Sato et al.
2021/0307055 A1* 9/2021 Tsai ...................... H04W 72/23
2022/0030660 A1 1/2022 Yi et al.
2022/0095331 A1 3/2022 Laselva et al.
2022/0346135 A1* 10/2022 Chen ................... H04W 72/569
2023/0164773 A1* 5/2023 Alfarhan ........... H04W 72/1268
370/329

FOREIGN PATENT DOCUMENTS

WO 2018/084565 A1 5/2018
WO 2020/148483 A1 7/2020

OTHER PUBLICATIONS

English translation of Written opinion for PCT Application No. PCT/JP2021/035363, mailed on Jan. 5, 2022.
Search Report dated Jun. 24, 2021 for GB2015341.7.
"NGMN 5G White Paper V1.0", the Next Generation Mobile Networks (NGMN) Alliance, Feb. 17, 2015, pp. 1-124.
"3rd Generation Partnership Project; Technical Specification Group Services and System Aspects; Service requirements for Machine-Type Communications (MTC); Stage 1 (Release 13)", 3GPP TS 22.368 V13.1.0, Annex B, Dec. 2014, pp. 1-26.
ZTE Corporation, "New Work Item on NR small data transmissions in INACTIVE state", 3GPP TSG RAN Meeting #86, RP-193252, Sitges, Spain, Dec. 9-12, 2019, pp. 1-4.
JP Office Action for Japanese Patent Application No. 2023-512750, mailed on Feb. 13, 2024 with English Translation.
Qualcomm Incorporated, "RACH based NR small data transmission", 3GPP TSG RAN WG2 #111-e R2-2007540, Aug. 2020, pp. 1-5.
Fujitsu, "Topics for small data transmission in INACTIVE", 3GPP TSG RAN WG2 #111-e R2-2006865, Aug. 2020, pp. 1-3.
Media Tek Inc. ,"Requirements and Solutions for INACTIVE Small Data Transmission", 3GPP TSG RAN WG2 #111-e R2-2006829, Aug. 2020, pp. 1-5.

* cited by examiner

COMMUNICATION SYSTEM

This application is a National Stage Entry of PCT/JP2021/035363 filed on Sep. 27, 2021, which claims priority from British Patent Application No. 2015341.7, filed on Sep. 28, 2020, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular, although not necessarily exclusive relevance to transmission of small data for user equipment in inactive state.

BACKGROUND ART

Recent developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an 'eNB' in LTE, 'gNB' in 5G) is the base station via which communication devices (user equipment or 'UE') connect to a core network and communicate to other communication devices or remote servers. For simplicity, the present application will use the term base station to refer to any such base stations.

For simplicity, the present application will use the term mobile device, user device, or UE to refer to any communication device that is able to connect to the core network via one or more base stations.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems, and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

For simplicity, the present application often refers to mobile devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

The core network (i.e. the 'EPC' in case of LTE and '5GC' in 5G) typically hosts functionality for subscriber management, mobility management, charging, security, and call/session management (amongst others), and provides connection for communication devices to external networks, such as the Internet.

Before a UE can communicate data via a base station, it needs to perform a so-called (contention-based) random access procedure with the base station serving the cell in which the UE is located. The random access procedure may comprise a 2-step (e.g. Release 15 and later) or a 4-step procedure, after which the UE enters to so-called Radio Resource Control (RRC) CONNECTED state and it can start sending/receiving data (both user plane data and control plane data) using resources allocated by (a base station of) the network. The UE's transition between RRC states is controlled by the network (using associated timers etc.). Typically, when a UE has no more data to send/receive, it is instructed by the network to move to the so-called RRC IDLE state, in order to free up network resources and to save battery at the UE's side. Every time the UE has data to send or receive, it needs to enter the RRC CONNECTED state again (after performing an appropriate random access procedure with the network). Whilst generally the RRC IDLE state is the most power efficient state, some UEs may need to transition between RRC IDLE and RRC CONNECTED frequently which results in increasing signalling and may adversely affect their power consumption as well.

Normally, the base station provides scheduling information (or scheduling 'grant') to specific RRC connected UEs (or groups of UEs) to allow them to communicate in the cellular communication system (i.e. transmit/receive data and control signalling) However, some UEs may be configured to transmit (uplink) data without an associated, explicit scheduling grant. This is referred to as 'configured grant type-1' and this approach may be beneficial in case of sporadic communications by a group of devices (e.g. MTC devices that do not have frequent transmissions) using specific communication resources where such sporadic communications are less likely to interfere with regular communications (e.g. by conventional UEs or other devices having scheduled transmissions).

The 3GPP NR standards also introduced the so-called RRC INACTIVE state, in addition to RRC IDLE and RRC CONNECTED. In the RRC INACTIVE state all DRBs and Signalling Radio Bearers (SRBs) are suspended, except 'SRB0'. However, the UE's Ng-U and Ng-C connections are maintained (unlike in RRC IDLE), which means that only the Common Control Channel (CCCH) is active (for SRB0). Thus, when new data arrives from an upper layer, it cannot be transmitted immediately. Data can only be transmitted after performing an RRC resume procedure, which causes the UE to resume (or reconfigure) all its DRB and SRBs.

For UEs in the RRC INACTIVE state, 3GPP intends to support certain communications (typically, a relatively small amount of data) without the UE having to (re-)activate/resume its RRC connection with the network. This functionality is referred to as 'small data transmission' and it is applicable to a number of traffic types, such as infrequent transmissions, short data bursts, and low throughput transmissions. Some of the benefits associated with small data transmission include a reduction in signalling overhead associated with RRC state transitions, lower battery consumption, and lower latency (compared to the case when the UE needs to transition into RRC connected state).

The motivation behind small data transmissions for UEs in INACTIVE state is described in 3GPP work item no. RP-193252. In summary, the small data transmission feature allows a UE to remain in the RRC INACTIVE state for certain downlink (mobile terminated, 'MT') and uplink (mobile originated, 'MO') data transmissions. In other words, the UE does not need to resume its RRC connection (i.e. move to the RRC CONNECTED state) for the data transmission and it does not need to subsequently release the connection (back to the RRC INACTIVE state) after data transmission, thereby the UE can avoid some of the associated drawbacks (e.g. increased power consumption and signalling overhead).

The key enablers for small data transmission (RRC INACTIVE state, 2-step, 4-step random access, and configured grant type-1) have been specified by 3GPP as part of Rel-15 and Rel-16 work. In Rel-17 small and infrequent data traffic will be allowed in INACTIVE state in the following use cases (amongst others):

- Smartphone applications:
  - traffic from Instant Messaging services (e.g. WhatsApp, QQ, WeChat, etc.);
  - heart-beat/keep-alive traffic from instant messaging/email clients and similar applications;
  - push notifications from various applications;
- Non-smartphone applications:
  - traffic from wearables (periodic positioning information etc.);
  - sensors (Industrial Wireless Sensor Networks transmitting temperature, pressure readings periodically or in an event triggered manner etc.); and
  - smart meters and smart meter networks sending periodic meter readings.

However, there are still some remaining challenges that need to be addressed. For example, it is still not clear whether small data transmissions should be conveyed using random access or configured grant (CG) procedure. On one hand, random access is more versatile while CG is more suitable for static UEs with known discontinuous reception (DRX) cycles. CG is more efficient and allows bigger pre-established payload sizes, potentially avoiding segmentation. CG requires reserving resources at the base station side and these resources may not be utilized (if there is no data to transmit). Moreover, small data transmission can be initiated using a CG only whilst the so-called Time Alignment Timer (TAT) is valid.

It is not clear, however, what happens when the TAT runs out. It is assumed that the default behaviour may be for the UE to fallback to small data transmission using random access procedure or perform an RRC Resume operation. There is no mechanism to reactivate/reconfigure CG. It may be beneficial to avoid going back to RRC_CONNECTED state in order to save battery and signalling overhead. For static UEs, typically UEs with a CG for small data transmission, reactivating their previous CG is expected to be more efficient than going back to the RRC_CONNECTED state.

SUMMARY OF INVENTION

Accordingly, preferred example embodiments of the present invention aim to provide methods and apparatus which address or at least partially deal with one or more of the above issues.

Although for efficiency of understanding for those of skill in the art, the invention will be described in detail in the context of a 3GPP system (UMTS, LTE, NR), the principles of the invention can be applied to other systems in which communication devices or User Equipment (UE) access a core network using a radio access technology.

In one example aspect, the invention provides a method performed by a user equipment (UE), the method including: initiating, when the UE is in a Radio Resource Control (RRC) Inactive state, a procedure for small data transmission; and receiving, as part of said procedure, configuration information relating to resources allocated for a subsequent small data transmission.

In one example aspect, the invention provides a method performed by communication apparatus of a radio access network, the method including: performing a small data transmission procedure with a user equipment (UE), when the UE is in a Radio Resource Control (RRC) Inactive state; and providing, as part of said procedure, configuration information relating to resources allocated for a subsequent small data transmission.

In one example aspect, the invention provides a user equipment (UE) for small data transmission in Radio Resource Control (RRC) Inactive state, the UE including: means for initiating, when the UE is in a Radio Resource Control (RRC) Inactive state, a procedure for small data transmission; and means for receiving, as part of said procedure, configuration information relating to resources allocated for a subsequent small data transmission.

In one example aspect, the invention provides communication apparatus of a radio access network, the communication apparatus including: means for performing a small data transmission procedure with a user equipment (UE), when the UE is in a Radio Resource Control (RRC) Inactive state and means for providing, as part of said procedure, configuration information relating to resources allocated for a subsequent small data transmission.

In another example aspect, the invention provides a user equipment (UE) for small data transmission in Radio Resource Control (RRC) Inactive state, the UE including a controller and a transceiver, wherein the controller is configured to initiate, when the UE is in a Radio Resource Control (RRC) Inactive state, a procedure for small data transmission; and control the transceiver to receive, as part of said procedure, configuration information relating to resources allocated for a subsequent small data transmission.

In another example aspect, the invention provides communication apparatus of a radio access network, the communication apparatus including a controller and a transceiver, wherein the controller is configured to perform a small data transmission procedure with a user equipment (UE), when the UE is in a Radio Resource Control (RRC) Inactive state, and control the transceiver to provide, as part of said procedure, configuration information relating to resources allocated for a subsequent small data transmission.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
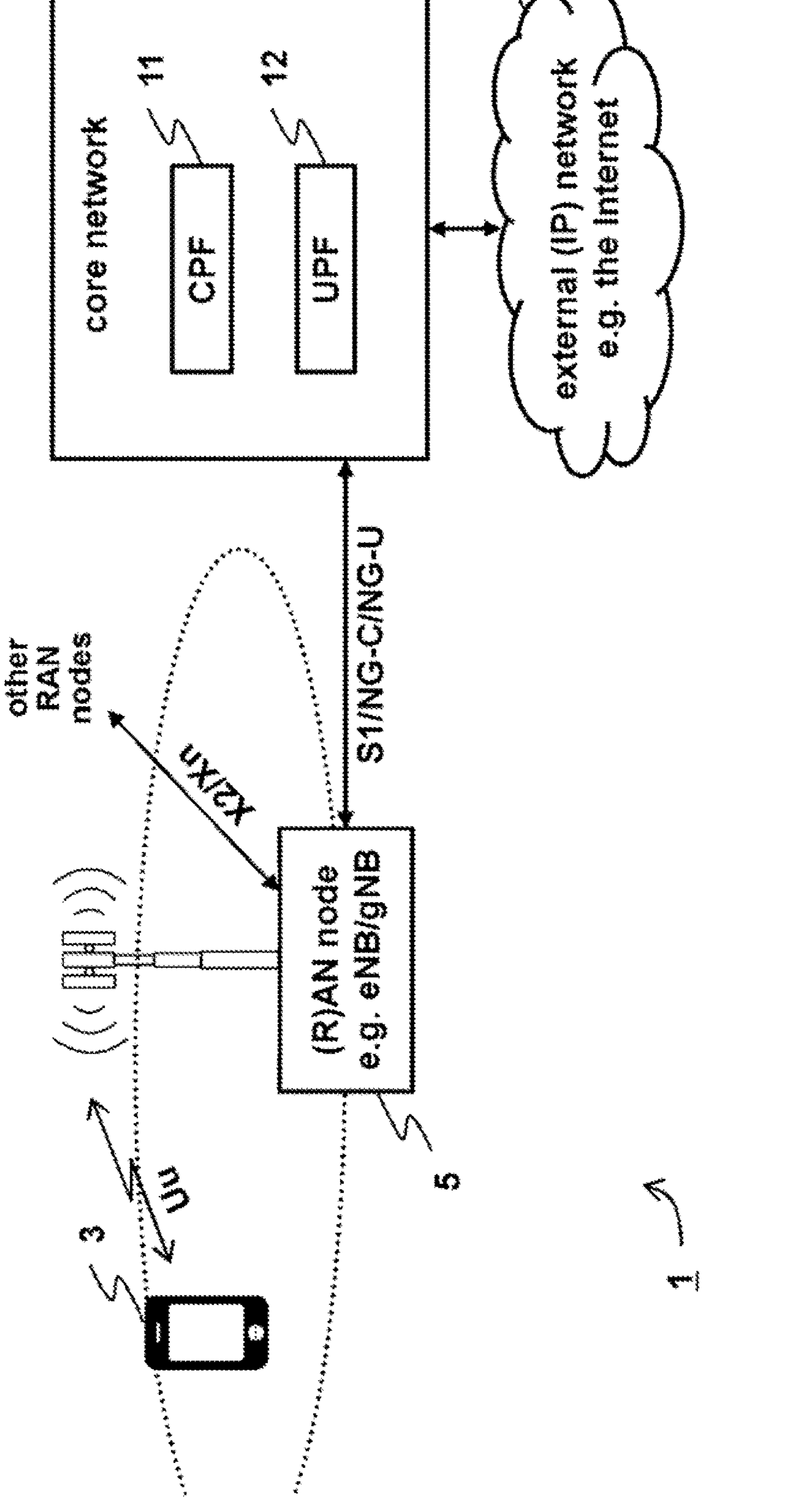
FIG. 1 illustrates schematically a mobile (cellular or wireless) telecommunication system to which example embodiments of the invention may be applied.

FIG. 1 schematically illustrates a mobile (cellular or wireless) telecommunication system 1 to which example embodiments of the present invention are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'NG-C', 'NG-U' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 11 and user plane functions (UPFs) 12. From the core network 7, connection to an external IP network 20 (such as the Internet) may also be provided.

In this system, uplink and downlink data transmissions and the specific time/frequency resources used for such transmissions are controlled by the base station 5. Specifically, when the base station 5 has downlink data to send, it notifies the intended recipient (e.g. by sending appropriate downlink control information (DCI) via a control channel), prior to sending the downlink data, about the resources that will be used for transmission of the downlink data so that the intended recipient knows which time/frequency resources are to be monitored and decoded. Similarly, when a mobile device 3 has uplink data to send, it requests the base station to allocate (via an appropriate DCI) uplink resources for the mobile device 3 to send data. This approach is referred to as a grant-based transmission.

The mobile device 3 may also be configured to communicate without such an explicit grant from the network, using resources allocated to configured grant type-1 communications (sometimes also referred to as grant-free transmissions). It will be appreciated that the specific set of time/frequency resources available for such configured grant transmissions may be allocated (by the base station 5) separately from any time/frequency resources normally used for grant-based transmissions (although they may also overlap with each other in at least one of the time domain and the frequency domain).

The system 1 supports both legacy (i.e. four-step) and two-step random access procedures. In the case of a four-step random access procedure, the UE (mobile device 3) transmits a Physical Random Access Channel (PRACH) preamble as the first step (referred to as 'Msg1'). If the base station detects the preamble, the base station 5 responds with a random access response (RAR), also known as 'Msg2'. The RAR includes the detected preamble identifier, a time-advance command, a temporary C-RNTI (TC-RNTI), and an uplink (UL) grant for scheduling a Physical Uplink Shared Channel (PUSCH) transmission from the UE (referred to as 'Msg3'). The UE 3 transmits Msg3 as scheduled and includes an identifier for contention resolution. Upon receiving Msg3, the network transmits a contention resolution message, also known as 'Msg4', with the contention resolution identifier. If the UE 3 successfully receives Msg4, and if it finds its contention resolution identifier in the message, it sends an acknowledgement on the Physical Uplink Control Channel (PUCCH), which completes the four-step random access procedure. As can be seen, the four-step random access procedure requires two round-trip cycles between the UE and the base station.

The two-step random access procedure aims to reduce latency and control-signalling overhead by using a single round trip cycle between the UE 3 and the base station 5. Effectively, this is achieved by combining the UE's PRACH preamble (Msg1) transmission and the scheduled PUSCH transmission (Msg3) into a single message (referred to as 'MsgA'). Similarly, the random-access response (RAR/

Msg2) from the base station 5 to UE 3 and the contention resolution message (Msg4) are combined in the two-step random access procedure (and referred to as 'MsgB'). The two-step random access is mainly intended for supporting (Ultra) Low Latency Communications, 10 ms control plane latency, fast handover, efficient channel access in unlicensed spectrum, and transmission of small data packets, amongst others.

The nodes of this network 1 are configured to support small data transmission services for the UE 3 in RRC INACTIVE state using configured grant (whilst an associated Time Alignment Timer (TAT) is valid). When the TAT has run out and the UE 3 still has data to send, the UE 3 can initiate small data transmission through an appropriate random access procedure (either 2-step or 4-step random access). In this case, the network (base station 5) reactivates or (re)configures the CG for the UE 3 as part of a handshake during the random access small data transmission (RACH SDT) procedure. It will be appreciated that reactivation of the CG may be applicable when the UE 3 is still within the same serving cell where the CG was initially/previously configured, whilst CG reconfiguration may be applicable for both the same or a different serving cell. CG reactivation/(re)configuration may be achieved using Radio Resource Control signalling, Medium Access Control signalling, or Physical Downlink Control Channel signalling, as appropriate.

Some of the benefits of the proposed approach is that there is no waste in signalling, since CG reactivation is part of the uplink small data transmission process. There is no need for the UE to switch to RRC_CONNECTED mode. Moreover, the network has total control over CG reactivation. It will be appreciated that the same (or similar) approach may also be used to configure a new CG for a UE frequently using random access for small data transmission. In other words, the proposed techniques may be used for controlling switching between random access based and CG-based small data transmission (or vice versa).

Mobile Device

Figure 2:
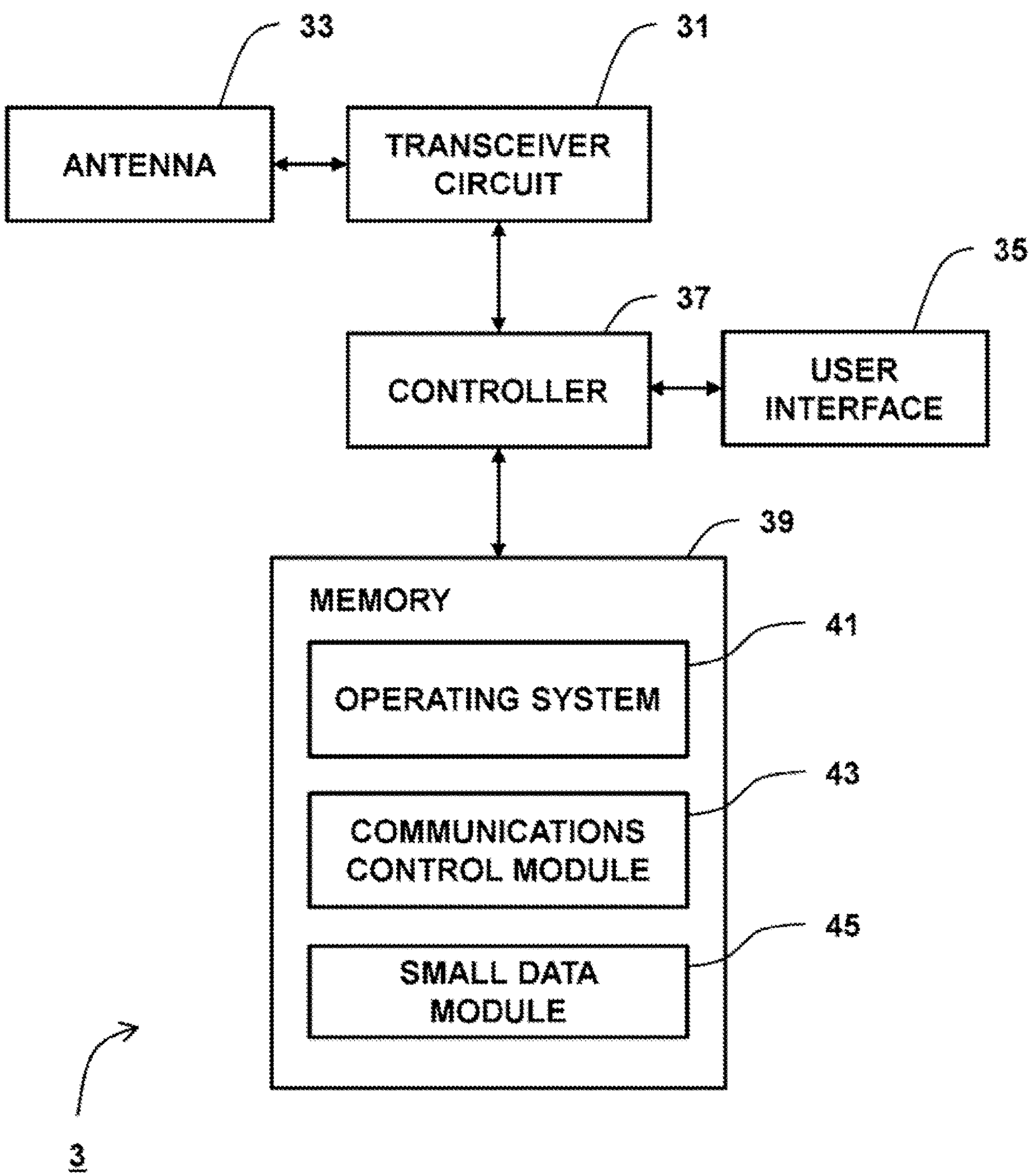
FIG. 2 is a block diagram of a User Equipment (UE) forming part of the system shown in FIG. 1.

FIG. 2 is a block diagram illustrating the main components of the mobile device 3 shown in FIG. 1 (e.g. a mobile telephone or an IoT device). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within memory 39. As shown, these software instructions include, among other things, an operating system 41, a communications control module 43, and a small data module 45.

The communications control module 43 is operable to control the communication between the mobile device 3 and its serving base station 5 (and other communication devices connected to the serving base station 5, such as other user equipment, core network nodes, etc.).

The small data module 45 is responsible for communicating small data transmissions, which may be sent (or received) without the mobile device 3 having an active RRC connection (for example while the mobile device 3 is in the RRC INACTIVE state). The small data module 45 is also responsible for handling a Time Alignment Timer (TAT) associated with configured grant(s) for small data transmissions and for initiating/performing CG reactivation/(re)configuration for small data transmissions, when the TAT expires (or it is no longer valid).

Figure 5:
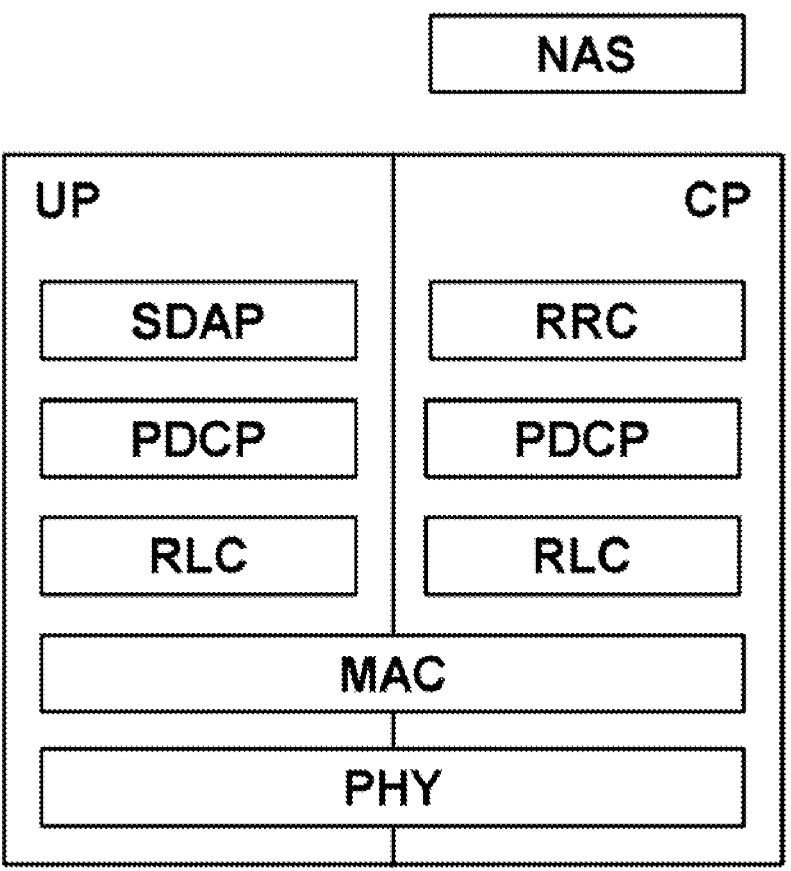
FIG. 5 is a schematic overview of the layers involved in small data transmission.

Although not shown in FIG. 2, the mobile device 3 will also typically include respective modules corresponding to the different communication layers. These modules may be implemented as part of the communications control module 43 and include one or more of the following: a Non-Access Stratum (NAS) module, a Radio Resource Control (RRC) module, a Service Data Adaptation Protocol (SDAP) module, a Packet Data Convergence Protocol (PDCP) module, a Radio Link Control (RLC) module, a Medium Access Control (MAC) module, and a physical layer (PHY) module. These communication layers are illustrated in FIG. 5, for both the user plane (UP) and the control plane (CP).

The RRC module is operable to generate, send and receive signalling messages formatted according to the RRC standard. For example, such messages are exchanged between the mobile device 3 and its serving base station 5. The RRC messages may include, for example, messages relating to small data transmission (or reception) including messages carrying small data transmissions and/or associated information (e.g. information relating to CG reactivation/(re)configuration for small data transmissions). The RRC module is also responsible for managing the mobile device's Radio Resource Control connection with the network and its RRC mode (e.g. RRC IDLE, RRC CONNECTED, and RRC INACTIVE).

The NAS module is operable to generate, send and receive signalling messages formatted according to the NAS standard. For example, such messages are exchanged between the mobile device 3 and a mobility management entity (MME) or an access and mobility function (AMF), via the serving base station 5, using the RRC module. The NAS messages may include, for example, messages relating to CG reactivation/(re)configuration for small data transmissions.

Base Station

Figure 3:
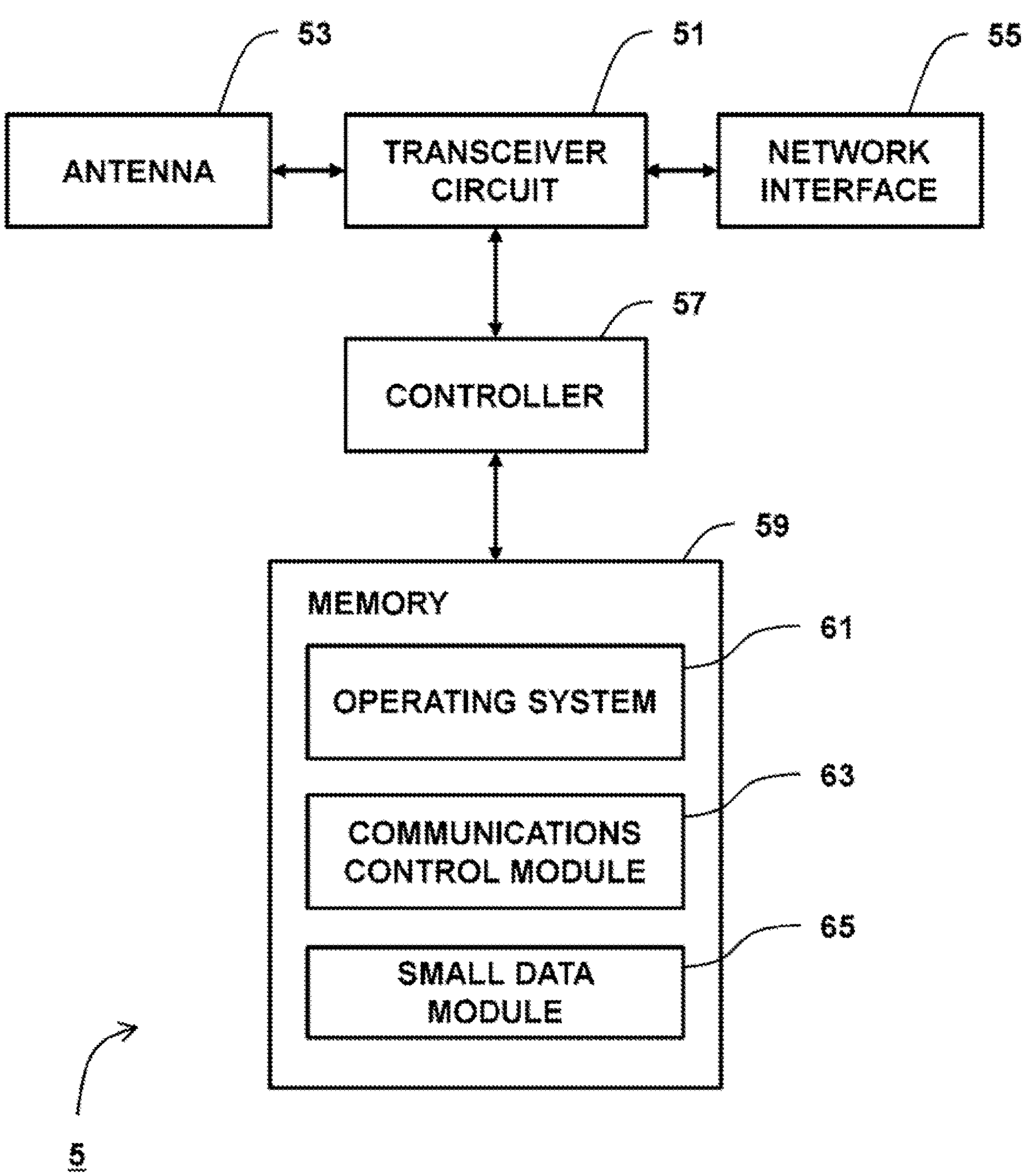
FIG. 3 is a block diagram of a base station forming part of the system shown in FIG. 1.

FIG. 3 is a block diagram illustrating the main components of a base station 5 shown in FIG. 1. As shown, the base station 5 has a transceiver circuit 51 for transmitting signals to and for receiving signals from user equipment (such as the mobile device 3) via one or more antenna 53, a core network interface 55 (e.g. an S1 interface, NG-C interface, and/or the like) for transmitting signals to and for receiving signals from the core network 7, and a base station interface 56 (e.g. an X2 interface, Xn interface, and/or the like) for transmitting signals to and for receiving signals from neighbouring base stations. The base station 5 has a controller 57 to control the operation of the base station 5 in accordance with software stored in a memory 59.

The software may be pre-installed in the memory 59 and/or may be downloaded via the telecommunication network 1 or from a removable data storage device (RMD), for example. The software includes, among other things, an operating system 61, at least a communications control module 63, and a small data module 65.

The communications control module 63 is responsible for handling (generating/sending/receiving) signalling between the base station 5 and other nodes, such as the UE 3 and the core network nodes. Such signalling may include, for example, control data for managing operation of the mobile device 3 (e.g. NAS, RRC, paging, system information, and/or the like).

The small data module 65 is responsible for handling small data transmissions for the mobile device 3 (for example while the mobile device 3 is in the RRC INACTIVE state).

Although not shown in FIG. 3, the base station 5 will also typically include a base station to base station interface module (e.g. X2/Xn module), an appropriate core network interface module (which may be implemented as part of the communications control module 43), and respective modules corresponding to the different communication layers (e.g. RRC module, SDAP module, PDCP module, RLC module, MAC module, and PHY module).

The base station to base station interface module is operable to generate, send and receive signalling messages (X2/Xn messages) formatted according to the X2AP (or XnAP) standard. The X2/Xn messages may include, for example, messages relating to paging a mobile device 3, handover, data forwarding, small data transmissions, transferring/fetching of UE context (and other information relating to the mobile device 3) between neighbouring base stations.

The core network interface module is operable to generate, send and receive signalling messages formatted according to the NG-C standard (or the S1AP standard in LTE), including messages carrying small data transmissions for the UE 3. For example, such messages are exchanged between the base station 5 and the MME/AMF and/or a serving gateway (S-GW).

The RRC module is operable to generate, send and receive signalling messages formatted according to the RRC standard. For example, such messages are exchanged between the base station 5 and the mobile device 3 (and other user equipment within the cell of the base station 5). The RRC messages may include, for example, messages relating to small data transmission (or reception) including messages carrying small data transmissions and associated information. The RRC module is also responsible for managing the mobile device's Radio Resource Control connection with the network and its RRC mode (e.g. RRC IDLE, RRC CONNECTED, and RRC INACTIVE).

Core Network Node

Figure 4:
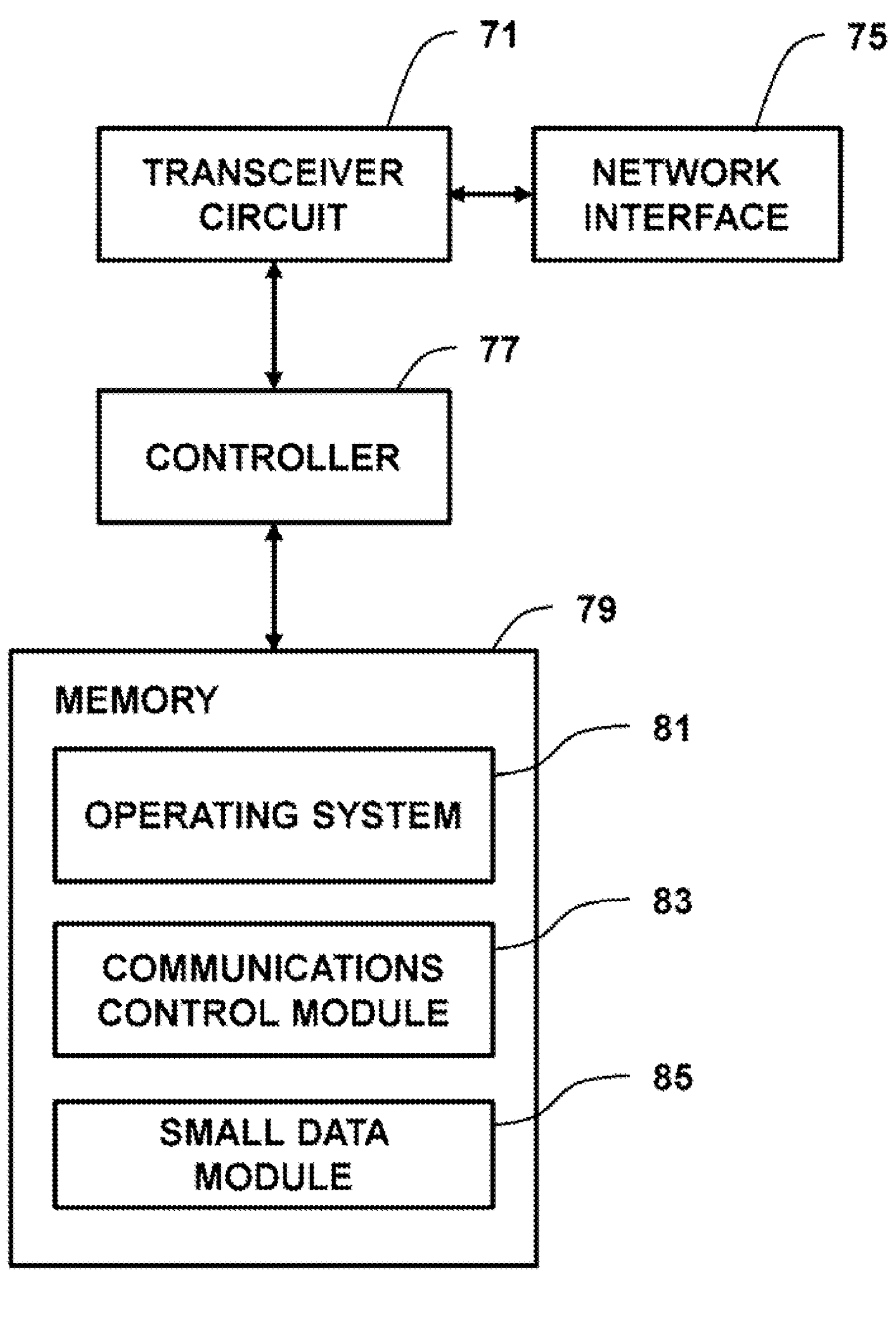
FIG. 4 is a block diagram of a core network node entity forming part of the system shown in FIG. 1.

FIG. 4 is a block diagram illustrating the main components of a generic core network node (or function) shown in FIG. 1, for example, the CPF 11 or the UPF 12. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signalling between the core network node and other nodes, such as the UE 3, the (R)AN node 5, and other core network nodes. The signalling may comprise, for example, signalling relating to CG reactivation/(re)configuration for small data transmissions between the mobile device 3 and the core network node.

DETAILED DESCRIPTION

A more detailed description will now be given of some exemplary ways in CG reactivation/(re)configuration may be achieved using appropriate Radio Resource Control (RRC) signalling, Medium Access Control (MAC) signalling, and/or Physical Downlink Control Channel (PDCCH) signalling.

As explained above, small data transmissions may be performed whilst the UE 3 is operating in the RRC_INACTIVE state. The RRC_INACTIVE state operation is triggered based on appropriately formatted control data from the network. Specifically, when the network (base station 5) releases the UE's RRC connection, it transmits an RRC_Release message which may include the suspendConfig information element (IE). This IE causes the UE 3 to go to RRC_INACTIVE state and perform the following actions:

- reset MAC;
- re-establish RLC entities for SRB1 (signalling radio bearer #1);
- store in the UE Inactive Access Stratum (AS) Context the current $K_{gNB}$ and $K_{RRCint}$ keys, the ROHC state, the stored Quality of Service (QoS) flow to Data Radio Bearer (DRB) mapping rules, the temporary identifier (C-RNTI) used in the source PCell, the cellIdentity and the physical cell identity of the source PCell, and all other parameters configured except for the ones within the ReconfigurationWithSync IE and servingCellConfigCommonSIB IE;
- suspend all SRB(s) and DRB(s), except SRB0;
- indicate PDCP suspend to lower layers of all DRBs;
- indicate the suspension of the RRC connection to upper layers; and
- enter RRC_INACTIVE and perform cell selection Thus, in the RRC INACTIVE state, and whilst an associated Time Alignment Timer (TAT) is valid, the UE 3 can perform small data transmission using its configured grant. When the TAT has run out, the UE 3 can initiate small data transmission through an appropriate random access procedure (either 2-step or 4-step random access). In this case, the network (base station reactivates or (re)configures the CG for the UE 3 as part of a handshake during the random access small data transmission (RACH SDT) procedure. Some possible ways of performing CG reactivation/(re)configuration (e.g. using RRC, MAC CE, or PDCCH) will be described below.

In a general sense, the network has various options for controlling the UE's small data transmission (SDT) operation, including (re)configuration of CG for SDT, (re)activation of CG for SDT, releasing CG for SDT, and switching between CG and random access based SDT.

(Re)configuration: When the UE 3 moves from the RRC CONNECTED mode to RRC INACTIVE mode, it may be initially configured with CG resources for SDT. The term reconfiguration refers to the provision of a new CG configuration and follows the same procedure as the initial configuration (in this case, any previous CG is released as a result of the reconfiguration). It will be appreciated that a special case of reconfiguration is the release of CG resources for SDT (although in this case the UE 3 may still be able to use random access).

(Re)activation: Activation refers to the process of activating an existing CG configuration (e.g. an initial or a reconfigured CG configuration), for example, after restarting an associated TAT. Thus, in this case, it is assumed that a CG is implicitly deactivated (and not released) after the TAT runs out. This approach allows re-activating a CG as many times as necessary.

Both options allow UEs in RRC INACTIVE mode to continue transmitting small data via CG resources even after the TAT has run out and then restarted again and without requiring excessive RRC signalling (such as when switching back to RRC_CONNECTED state).

The following is a more detailed description of various methods for configuring or reconfiguring CG while staying in RRC_INACTIVE state, and various methods for reactivating an expired CG while staying in RRC_INACTIVE state. We will provide examples of practical implementation as well as possible combinations between various configuration and reactivation methods.

(Re)Configuration Options

Option 1a: (Re)Configuration at RRC Level

In this case, the network (base station 5) configures resources for CG through an appropriately formatted RRC message (for example an 'RRCRelease' message including a SuspendConfig IE). This message is sent from the base station 5 to the UE 3 during the small data transmission procedure. The contents of an exemplary SuspendConfig information element are shown below:

TABLE 1

```
SuspendConfig ::=            SEQUENCE {
  fullI-ANTI                   I-RNTI-Value,
  shortI-RNTI                  ShortI-RNTI-Value,
  ran-PagingCycle              PagingCycle,
  ran-NotificationAreaInfo       OPTIONAL,   -- Need M
  t380                         PeriodicRNAU-TimerValue OPTIONAL,   -- Need R
  nextHopChainingCount         ,
  ConfigGrantforSmallDataTransmission {SetupRelease { ConfigGrant }}   OPTIONAL
  ...
}
```

Figure 6:
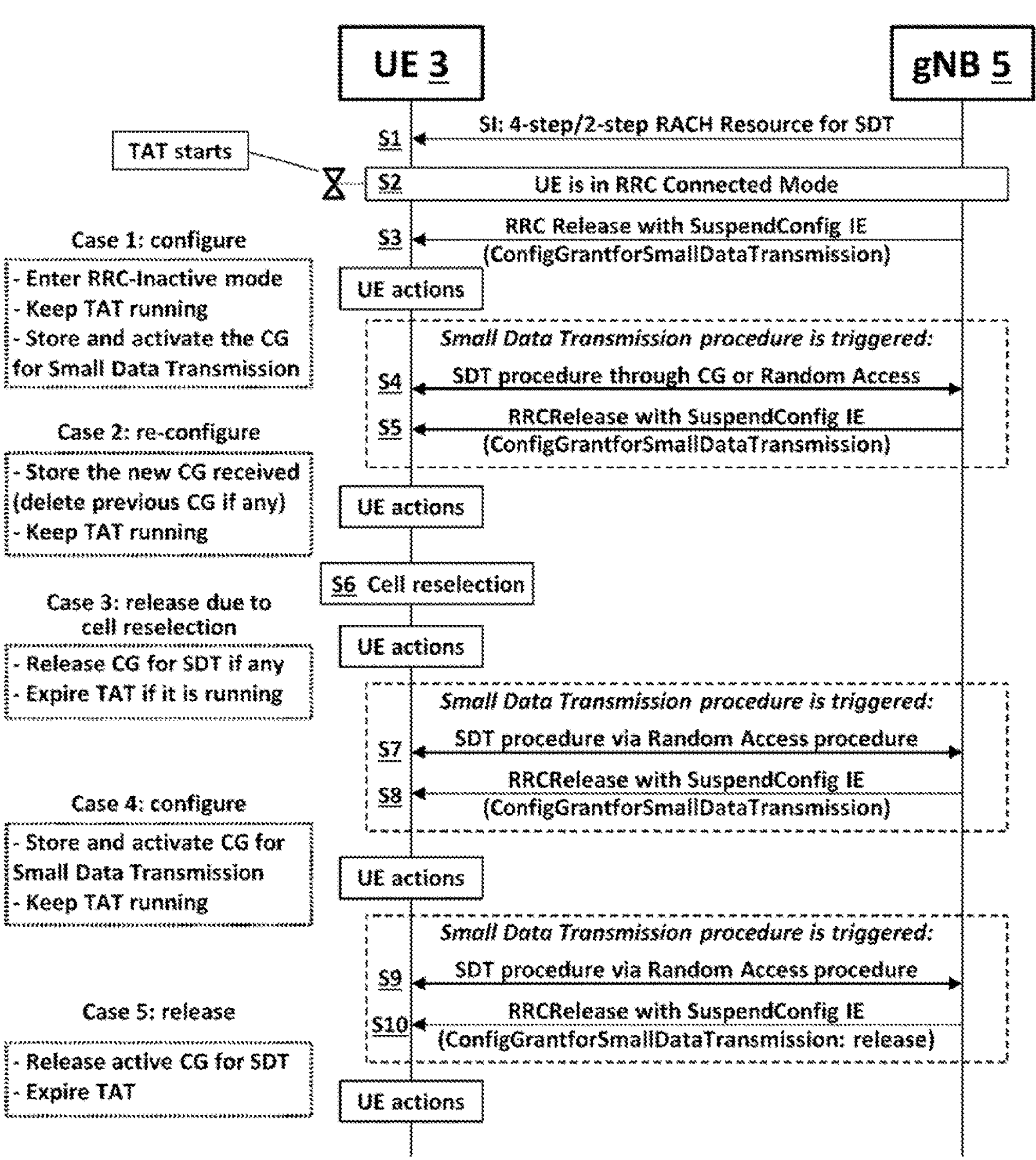
FIG. 6 is a schematic signalling (timing) diagram illustrating some exemplary ways in which a configured grant may be (re)configured/released using an RRC message.

Further details and implementation options are shown in FIG. 6. As can be seen, in step S1, the UE 3/mobile device may be configured to obtain information identifying resources for random access from system information (SI) transmitted by the base station 5. It will be appreciated that there may be different random access resources allocated to different (groups of) UEs and different resources may be allocated to 2-step and 4-step random access. When the UE 3 is in RRC connected mode, it starts an associated TAT, as generally shown in step S2.

If the network initially configures resources for small data transmissions via configured grant (CG), the UE 3 receives such configuration via the message suspending the UE's RRC connection. This corresponds to 'Case 1' of FIG. 6. Specifically, as shown in step S3, the network transmits an 'RRCRelease' message comprising a SuspendConfig IE to the UE 3, which includes a ConfigGrantforSmallDataTransmission IE (and/or the like) informing the UE 3 about the parameters/resources for Small Data Transmission using configured grant (configured grant type-1). This message, more specifically the information included in the SuspendConfig IE, causes the UE to enter RRC Inactive mode and keep the TAT running. The UE 3 also stores (using its small data module 45) the parameters identifying the CG resources to be used (when there is small data to transmit). Thus, when the UE 3 has small data to send, it triggers the small data transmission procedure and activates the stored CG. Therefore, as generally shown in step S4, the UE 3 (using its small data module 45) performs an appropriate SDT procedure using the CG resources allocated for Small Data Transmission, which is followed by the network releasing the UE's RRC connection back to the RRC Inactive state (step S5). Alternatively, the UE 3 may perform an SDT procedure in step S4 using random access.

As part of suspending the RRC connection or completing the small data transmission procedure and staying in RRC-Inactive mode, the base station 5 transmits an appropriately formatted RRC message to the UE 3, including a ConfigGrantforSmallDataTransmission IE (in a SuspendConfig IE) configuring, or reconfiguring, the parameters/resources to be used for the UE's subsequent Small Data Transmission. The RRC message may comprise an 'RRCRelease' message (as shown in step S5 of FIG. 6) or a 'Small Data Transmission Complete' message. Effectively, the message at step S5 may be used for configuring new CG resources for the UE 3 (i.e. 'Case 1') or for re-configuring the CG resources ('Case 2') which involves updating at least one parameter used for the SDT.

Turning now to 'Case 3' of FIG. 6, the UE 3 may be configured to release (or deactivate) its stored CG parameters when it changes cells (see step S6, cell reselection). Thus, even if the TAT is still valid and the UE 3 has an initial or re-configured CG for SDT, it is possible to avoid transmissions in the UE's new cell using resources that may not be appropriate for SDT in that cell. Thus, when the CG is cell specific (when the ConfigGrantforSmallDataTransmission IE in step S3 or S5 is valid for the current cell only), the UE 3 will expire the TAT upon cell reselection and release any CG for SDT.

However, even in this case, the UE 3 may beneficially be able to perform an appropriate SDT procedure via Random Access procedure, as generally shown in step S7, and obtain new CG parameters/resources for the UE's subsequent Small Data Transmission using CG. This scenario is referred to as 'Case 4' in FIG. 6, in which a random access based small data procedure is used for configuring CG resources for SDT. In other words, it is possible to instruct the UE 3 to switch from using random access to CG for its subsequent small data transmissions. Similarly to the above cases, the applicable CG parameters may be provided by the network as part of the small data procedure, e.g. in an 'RRCRelease' message (as shown in step S8 of FIG. 6) or in a 'Small Data Transmission Complete' message, by transmitting an appropriately formatted ConfigGrantforSmallDataTransmission IE (in a SuspendConfig IE).

Another advantageous use of RRC signalling is illustrated in steps S9 and S10 of FIG. 6 that relate to a scenario in which the network (gNB 5) instructs the UE 3 to release its active CG for SDT (this generally involves expiry of the associated TAT).

This is scenario is denoted 'Case 5'. In this case, as part of the small data procedure, the network transmits an appropriately formatted ConfigGrantforSmallDataTransmission IE (in a SuspendConfig IE) instruction the UE 3 to release its stored CG information. It will be appreciated that the small data procedure may be a random access based SDT (as shown in step S9 of FIG. 6) or a CG based SDT. The instruction to release/deactivate the CG parameters may be provided by the network for example in an 'RRCRelease' message (as shown in step S10 of FIG. 6) or in a 'Small Data Transmission Complete' message. It will be appreciated that as a result of this message the UE 3 will not attempt to transmit small data via CG although it may still use random access.

In summary, a CG is kept/stored by the UE 3 until it is explicitly released by the base station 5 or the UE 3 changes the serving cell.

Option 1b: (Re)Configuration at MAC Level

It will also be appreciated that CG (re)configuration may also be performed at the MAC level.

Figure 7:
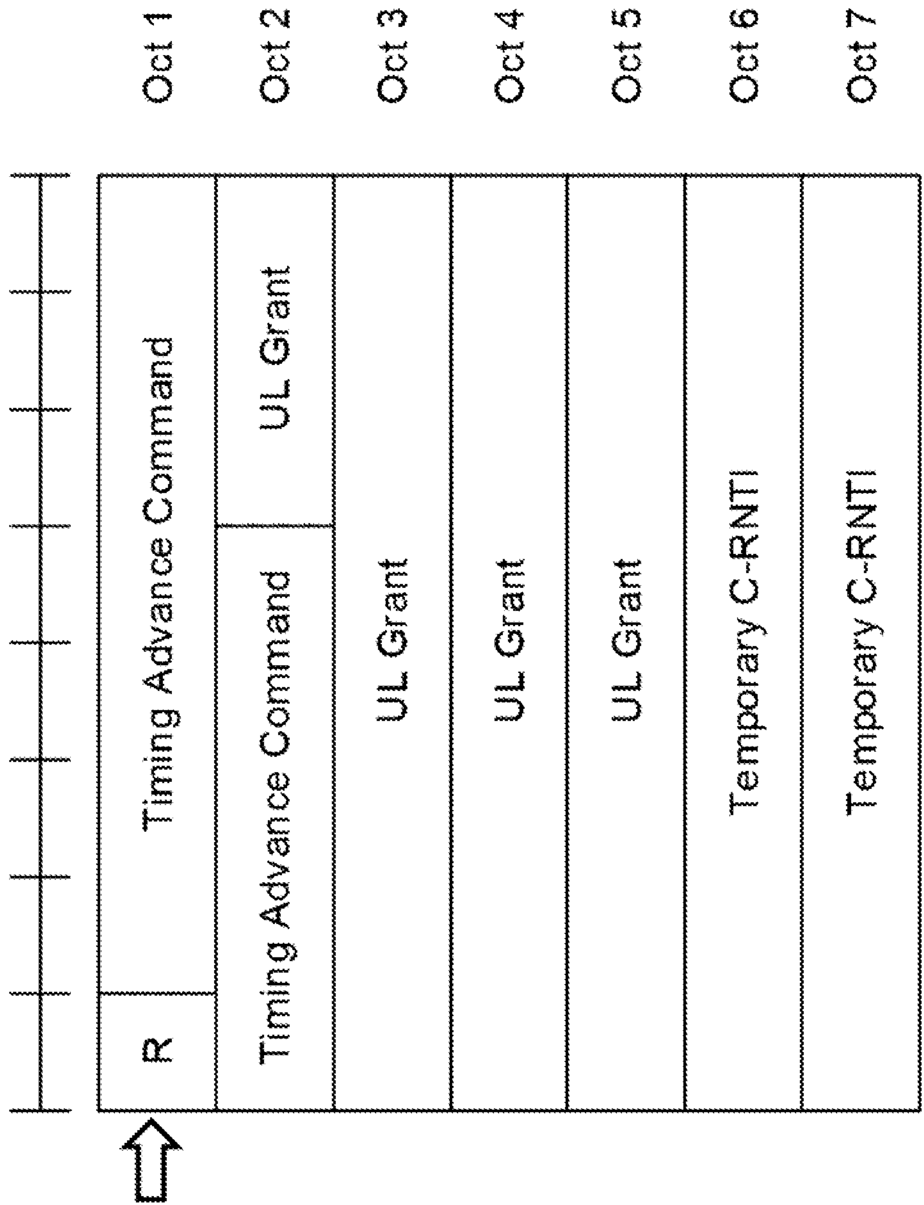
FIG. 7 illustrates schematically an exemplary random access response for configuring and activating configured grant for small data transmission.

As a first variant of this option, the applicable CG configuration may be provided within the Random Access Response (RAR) from the base station 5 to the UE 3. For example, as generally shown in FIG. 7, the current RAR may be modified to use the so-called 'R' bit to indicate the grant is a CG and not a one-shot grant. It will be appreciated that such a bit (or bits) may be included in any suitable location in the RAR signalling. Since RACH resources are assumed to be separated for RACH SDT, the RAR can be modified to include a configuration bit as well as optional CG configuration.

For example, the R bit may be set to '1' (or '0') to indicate that the UL grant in this RAR is for a re-occurred CG instead of a one-shot grant, and it is activated immediately. When the R bit is set to '0' (or alternatively, '1') the UL grant in the RAR is for one-shot grant only. It will be appreciated that the R bit may be included in the RAR message (in 4-step random access) or in the fallback RAR (in 2-step random access falling back to 4-step random access).

As a second variant of the MAC based option, the applicable CG configuration may be provided using a new MAC Control Element (CE). This variant is compatible with other RRC-less solutions.

Option 1c: (Re)Configuration at PDCCH Level

In this case, the network configures CG using PDCCH and part of the CG information e.g. a periodicity may be preconfigured via an appropriate RRC message (and/or the like).

Option 1d: Hybrid RRC/MAC (Re)Configuration

The network (base station 5) may configure the UE 3 with multiple CG resources (grants) having different sizes/periodicities at RRC level. For example, the CG resources may be configured using the 'RRCRelease' message or the 'Small Data Transmission Complete' message, as described above, or any other suitable RRC message. The CG resources may be provided in the form of a list, for example, via the SuspendConfig IE. It will also be appreciated that multiple RRC messages may be used, if appropriate. The contents of an exemplary SuspendConfig IE in accordance with option 1d are as follows:

TABLE 2

```
SuspendConfig ::=                 SEQUENCE {
  fullI-RNTI                        I-RNTI-Value,
  shortI-RNTI                       ShortI-RNTI-Value,
  ran-PagingCycle                   PagingCycle,
  ran-NotificationAreaInfo          RAN-NotificationAreaInfo OPTIONAL,    -- Need M
  t380                              PeriodicRNAU-TimerValue OPTIONAL,     -- Need R
  nextHopChainingCount              NextHopChainingCount,
  ConfigGrantforSmallDataTransmissionList
    SEQUENCE (SIZE (1-MaxNofConfigGrantforSmallDataTransmission)) OF
    ConfigGrantforSmallDataTransmission
  ...
}
```

In this case the base station 5 can rely on the MAC layer to indicate to the UE 3 which one of the stored (active) CG resources is to be used for SDT. Beneficially, this approach is more dynamic and involves less RRC overhead for reconfiguration than some of the other options. This option is also compatible with other RRC-based methods.

Reactivation Options

Option 2a: Reactivation at RRC Level

It will be appreciated that the network (base station 5) may instruct the UE 3 to reactivate its CG using an appropriately formatted RRC message (e.g. RRCRelease message with a SuspendConfig IE), sent during small data transmission procedure. For example, the RRC message may be configured to indicate that a CG is to be reactivated using a single bit. Effectively, this causes the UE to restart its TAT and activate the CG for subsequent Small Data Transmission.

Option 2b: Reactivation at MAC Level

CG reactivation may be performed at the MAC level. In this case, the Random Access Response (RAR) from the base station 5 to the UE 3 may be adapted to use the 'R' bit to indicate CG reactivation for SDT (similarly to the option illustrated in FIG. 7).

Option 2c: Reactivation at PDCCH Level

The network (base station 5) may reactivate a CG by transmitting an appropriately formatted Downlink Control Information (DCI) via the PDCCH.

Option 2d: Hybrid RRC/MAC Reactivation

In this case appropriate information at the MAC layer (e.g. 1, 2, or 3 bits of a MAC CE/RAR) may be used to indicate which configuration (if any) is to be used and the UE 3 activates the relevant CG (any other CGs are deactivated). This option may work with multiple CGs configured from RRC CONNECTED state or in combination with Option 1d. It will be appreciated that a default CG from the CG list may be defined for initial use.

Option 2e: Implicit Reactivation

A CG stored by the UE 3 may be reactivated automatically along with the TAT during a random access based SDT (at least until it is explicitly released by the network).

Figure 8:
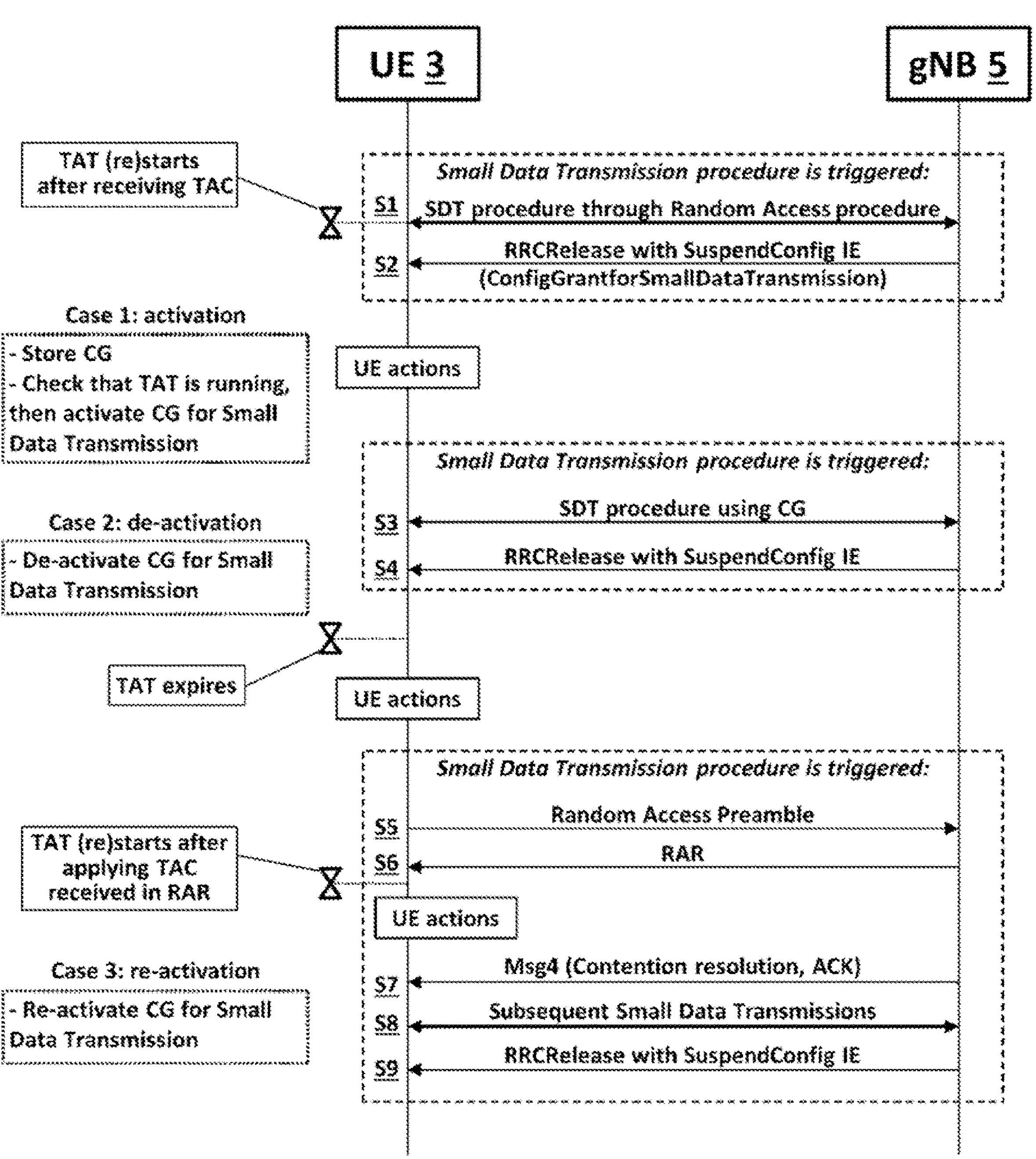
FIG. 8 is a schematic signalling (timing) diagram illustrating some exemplary ways in which a configured grant may be (re)activated implicitly.

FIG. 8 illustrates three possibilities (denoted 'Case 1' to 'Case 3') for controlling the UE's small data transmission operation by way of activation, re-activation, and de-activation of an earlier CG. These procedures may be performed in combination with any of the procedures shown in FIG. 6.

It is assumed that a CG is (re)activated when the associated TAT is running, and deactivated when the TAT expires.

When the CG is de-activated (or all CGs are de-activated if there are multiple), small data transmission can only be done through either a 4-step or a 2-step random access procedure. In the examples shown in FIG. 8, the 4-step random access procedure is used.

It is possible to define a new TAT e.g. SDT-TAT (or another suitable timer) for the purpose of small transmission procedure in RRC inactive mode, otherwise the same TAT that is used for RRC connected mode will be reused for this purpose.

Case 1 illustrates activation of an initially (re)configured CG for subsequent SDT purposes. As generally shown in steps S1 and S2, when a small data transmission procedure is triggered, and if the UE 3 does not have stored CG for SDT or has stored CG for SDT but none of them activated, in this case, a small data transmission procedure is triggered and will be done via random access (step S1). Within step S1, the network transmits a Random Access Response including a time advance command (TAC). This allows the UE 3 to restart its TAT, after finishing the small data transmission, the UE 3 can keep the TAT running and automatically activate the CG stored by UE 3 (in its small data module 45) which is reconfigured via the RRC message in step S2. The UE 3 can subsequently use the stored CG parameters/resources when there is small data to transmit. Accordingly, the UE 3 does not need to use random access for SDT. Instead, the UE 3 triggers the small data transmission procedure based on the activated CG (as in e.g. step S3 of FIG. 8).

Case 2 illustrates an exemplary way of de-activating a stored CG for SDT purposes. In this case, the UE 3 may perform SDT procedure(s) using its stored CG as long as it is activated (step S3) i.e. the TAT (or 'SDT-TAT') is running. However, at some point of time, the TAT/SDT-TAT may run out/expire. Consequently, the CG is deactivated.

Case 3 illustrates an exemplary way of re-activating a stored CG for SDT purposes, for example, following deactivation by the network or following regular expiry of the associated TAT (as in Case 2).

Specifically, in this case, a small data transmission procedure is triggered via random access (step S5). In step S6, the network transmits a Random Access Response including a time advance command (TAC). This allows the UE 3 to restart its TAT and re-activate the corresponding CG for small data transmission. In this example, the procedure ends with step S9 (after small data transmission has been completed) in which the network did not include any CG for small data transmission at the UE 3, in this case the UE 3 may keep the stored CG if any. However, it will be appreciated that the network may decide to reconfigure the CG as in step S2, in this case the UE 3 will replace the stored CG to the newly reconfigured CG. In either case, the stored CG will be re-activated after the UE 3 restarted the TAT.

Combination of Different (Re)Configuration and Reactivation Options

It will be appreciated that the above described (re)configuration and reactivation options may be combined, when appropriate, to provide further alternatives. There are various combinations of options for configuration and reactivation, although some configuration options are more suited with some reactivation options, such as:

- Configuration through RRC message (Option 1a) and implicit reactivation (Option 2e). This allows the network to configure an adequate CG once it thinks that the UE would need it and if the network can afford it (e.g. after a learning period from random access based SDT). This is effectively a combination of the methods described above with reference to FIGS. 6 and 8.
- Configuration through RRC message (Option 1a) and reactivation at MAC layer (Option 2b). This combination is similar to Options 1d/2d but with only one CG that is either activated or deactivated. In this case the CG is kept/stored until it is explicitly released by the network or the UE changes serving cell. The CG is initially activated and then deactivated when the TAT expires. After TAT expiry, the base station 5 can use e.g. 1 bit in a suitable MAC CE/RAR to reactivate the CG, otherwise, the CG will stay in deactivated state.
- Configuration and reactivation at MAC level (Options 1b and 2b). See FIG. 7.
- Combination of Options 1c and 2c (PDCCH based solutions). In this case, the RRC layer may pre-configure at least a part of a CG e.g. periodicity, CS-RNTI (RNTI used for CG activation and deactivation). In this case, therefore, PDCCH/DCI addressed with CS-RNTI may be used to activate/release a periodically appeared grant. This combination is similar to configured grant type-2 used in RRC-CONNECTED mode.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above examples the UE used a specific timer (TAT) for controlling activation of a CG for small data transmission. However, it will be appreciated that any other suitable timer may be used, such as a new type of TAT (e.g. SDT-TAT) or any other timer (new or existing) adapted for the purpose of small transmission procedure in RRC inactive mode.

It will be appreciated that CG re-activation may be applicable when the UE is still within the same serving cell where the CG was initially/previously configured, whilst CG reconfiguration may be applicable for both the same or a different serving cell.

The UE may receive an explicit indication/configuration from the network to allow small data transmission via the control plane. The indication/configuration may be sent via an appropriate broadcast message or a unicast message (e.g. an RRC release message or an RRC suspension message and/or the like). The UE may be configured to apply any associated restriction for the small data transmission service (e.g. transport block size limitation, allowed QoS flows, etc.). If no specific restrictions are configured, small data transmissions may be allowed up to the maximum size of the message carrying the SDT or transport block (TB) size.

When small data arrives from an upper layer, and if the size of the data (optionally with necessary padding and information elements) does not exceed the maximum size defined for small data transmission (and also pass any other restrictions specified or configured), the UE can initiate the small data transmission procedure. In this case, the UE generates a small data transmission message at the RRC layer (using its RRC module) and sends it to lower layers for transmission (i.e. MAC and PHY layers). If the data from upper layers cannot be sent as 'small data' (e.g. due to its size or due to any other applicable restriction), then the UE may be configured to generate an appropriately formatted RRC resume request message and sends it to lower layers for transmission so that the data can be transmitted in the normal manner (in RRC CONNECTED mode).

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The User Equipment (or "UE") in the present disclosure is an entity connected to a network via a wireless interface. The UE may also be referred to as "mobile station", "mobile device", "wireless device", or "wireless transmit/receive unit" (WTRU).

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; moulds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyser, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to Internet of things' (IoT), using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 3

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an Mobile Virtual Network Operator (MVNO) service, an emergency radio communication system, a Private Branch eXchange (PBX) system, a PHS/Digital Cordless Telecommunications system, a Point of sale (POS) system, an advertise calling system, a Multimedia Broadcast and Multicast Service (MBMS), a Vehicle to Everything (V2X) system, a train radio system, a location related service, a Disaster/Emergency Wireless Communication Service, a community service, a video streaming service, a femto cell application service, a Voice over LTE (VoLTE) service, a charging service, a radio on demand service, a roaming service, an activity monitoring service, a telecom carrier/communication NW selection service, a functional restriction service, a Proof of Concept (PoC) service, a personal information management service, an ad-hoc network/Delay Tolerant Networking (DTN) service, etc.

Further, the above-described UE categories are merely examples of applications of the technical ideas and example embodiments described in the present document. Needless to say, these technical ideas and example embodiments are not limited to the above-described UE and various modifications can be made thereto.

The configuration information may be adapted to identify at least one of: a current configuration to be used by the UE for a subsequent small data transmission; a new or updated configuration to be used by the UE for a subsequent small data transmission; one of a plurality of configurations to be used by the UE for a subsequent small data transmission; a stored configuration to be activated by the UE for a subsequent small data transmission; a stored configuration to be re-activated by the UE for a subsequent small data transmission; a stored configuration to be de-activated by the UE for small data transmission; a stored configuration to be released by the UE release for small data transmission; and a current configuration to be maintained for a subsequent small data transmission after an associated timer runs out.

The configuration information may include a SuspendConfig information element. The configuration information may identify a configured grant for small data transmissions. The configuration information may include an information element relating to a configured grant for small data transmissions (e.g. ConfigGrantforSmallDataTransmission IE).

The UE may receive the configuration information using at least one of: RRC signalling; Medium Access Control (MAC) signalling (e.g. in a MAC Control Element); a Random Access Response (RAR) message; and Physical Downlink Control Channel (PDCCH) signalling (e.g. in a Downlink Control Information (DCI)).

The procedure for small data transmission may include transmitting a message including the small data transmission using a resource associated with a 'configured grant type-1'. The procedure for small data transmission may include transmitting the small data transmission via a message forming part of a random access procedure (e.g. 'Msg3' or 'MsgA').

The method performed by the UE may further include restarting a timer associated with a stored configuration for small data transmission upon receipt of a time advance command (TAC) and re-activating the stored configuration for a subsequent small data transmission.

When the UE holds information identifying a configured grant for small data transmission, the method may include: if an associated time alignment timer (TAT) is running, initiating the procedure for small data transmission using the configured grant; and if the associated TAT is not running, initiating the procedure for small data transmission via random access and determining, based on the received configuration information, whether to activate the information identifying a configured grant for a subsequent small data transmission.

The method may further include receiving, by the UE via RRC signalling or PDCCH signalling, information identifying a plurality of candidate resources for small data transmission (e.g. a plurality of 'configured grant type-1' configurations); and receiving, via MAC signalling, information identifying at least one of the candidate resources for performing the small data transmission.

Various other modifications will be apparent to those skilled in the art and will not be described in further detail here.

The whole or part of the example embodiments disclosed above can be described as, but not limited to, the following supplementary notes.

(Supplementary Note 1)

A method performed by a user equipment (UE), the method including:

initiating, when the UE is in a Radio Resource Control (RRC) Inactive state, a procedure for small data transmission; and receiving, as part of the procedure, configuration information relating to resources allocated for a subsequent small data transmission.

(Supplementary Note 2)

The method according to supplementary note 1, wherein the configuration information is adapted to identify at least one of:

a current configuration to be used by the UE for a subsequent small data transmission;

a new or updated configuration to be used by the UE for a subsequent small data transmission;

one of a plurality of configurations to be used by the UE for a subsequent small data transmission;

a stored configuration to be activated by the UE for a subsequent small data transmission;

a stored configuration to be re-activated by the UE for a subsequent small data transmission;

a stored configuration to be de-activated by the UE for small data transmission;

a stored configuration to be released by the UE release for small data transmission; and a current configuration to be maintained for a subsequent small data transmission after an associated timer runs out.

(Supplementary Note 3)

The method according to supplementary note 1 or 2, wherein the configuration information includes a Suspend-Config information element.

(Supplementary Note 4)

The method according to any of supplementary notes 1 to 3, wherein the configuration information identifies a configured grant for small data transmissions.

(Supplementary Note 5)

The method according to any of supplementary notes 1 to 4, wherein the configuration information includes an information element (e.g. ConfigGrantforSmallDataTransmission IE) relating to a configured grant for small data transmissions.

(Supplementary Note 6)

The method according to any of supplementary notes 1 to 5, wherein the UE receives the configuration information using at least one of: RRC signalling; Medium Access Control (MAC) signalling (e.g. in a MAC Control Element); a Random Access Response (RAR) message; and Physical Downlink Control Channel (PDCCH) signalling (e.g. in a Downlink Control Information (DCI)).

(Supplementary Note 7)

The method according to any of supplementary notes 1 to 6, wherein the procedure for small data transmission includes transmitting a message including the small data transmission using a resource associated with a 'configured grant type-1'.

(Supplementary Note 8)

The method according to any of supplementary notes 1 to 7, wherein the procedure for small data transmission includes transmitting the small data transmission via a message forming part of a random access procedure (e.g. 'Msg3' or 'MsgA').

(Supplementary Note 9)

The method according to any of supplementary notes 1 to 8, further including restarting a timer associated with a stored configuration for small data transmission upon receipt of a time advance command (TAC) and re-activating the stored configuration for a subsequent small data transmission.

(Supplementary Note 10)

The method according to any of supplementary notes 1 to 9, wherein the UE holds information identifying a configured grant for small data transmission, and the method includes:

if an associated time alignment timer (TAT) is running, initiating the procedure for small data transmission using the configured grant; and if the associated TAT is not running, initiating the procedure for small data transmission via random access and determining, based on the received configuration information, whether to activate the information identifying a configured grant for a subsequent small data transmission.

(Supplementary Note 11)

The method according to any of supplementary notes 1 to 10, further including:

receiving, via RRC signalling or PDCCH signalling, information identifying a plurality of candidate resources for small data transmission (e.g. a plurality of 'configured grant type-1' configurations); and receiving, via MAC signalling, information identifying at least one of the candidate resources for performing the small data transmission.

(Supplementary Note 12)

A method performed by communication apparatus of a radio access network, the method including:

performing a small data transmission procedure with a user equipment (UE), when the UE is in a Radio Resource Control (RRC) Inactive state; and providing, as part of the procedure, configuration information relating to resources allocated for a subsequent small data transmission.

(Supplementary Note 13)

A user equipment (UE) for small data transmission in Radio Resource Control (RRC) Inactive state, the UE including:

means for initiating, when the UE is in a Radio Resource Control (RRC) Inactive state, a procedure for small data transmission; and means for receiving, as part of the procedure, configuration information relating to resources allocated for a subsequent small data transmission.

(Supplementary Note 14)

Communication apparatus of a radio access network, the communication apparatus including:

means for performing a small data transmission procedure with a user equipment (UE), when the UE is in a Radio Resource Control (RRC) Inactive state; and means for providing, as part of the procedure, configuration information relating to resources allocated for a subsequent small data transmission.

This application is based upon and claims the benefit of priority from United Kingdom Patent Application No. 2015341.7, filed on Sep. 28, 2020, the disclosure of which is incorporated herein in its entirety by reference.

What is claimed is:

1. A method performed by a user equipment (UE) in a Radio Resource Control (RRC) inactive state, the method comprising:

initiating a procedure for small data transmission (SDT);

as part of the procedure, receiving, while the UE is in the RRC inactive state and using a Medium Access Control (MAC) layer, configuration information relating to at least one resource for a subsequent SDT;

maintaining the configuration information from the MAC layer in the UE when an SDT specific time alignment timer (SDT-TAT) expires, and configuring the subsequent small data transmission using the configuration information maintained in the UE.

2. The method according to claim 1, wherein the configuring includes configuring the at least one resource indicated by the configuration information.

3. The method according to claim 1, wherein the configuring includes activating a configuration for the subsequent small data transmission based on the configuration information stored in the UE.

4. The method according to claim 3, wherein the activating the configuration is applied to a same cell where the configuration was previously configured.

5. The method according to claim 3, further comprising:

deactivating the configuration based on the configuration information stored in the UE upon expiry of the SDT-TAT associated with the configuration; and restarting the SDT-TAT upon receipt of a time advance command (TAC), wherein the activating the configuration is performed after the restarting the SDT-TAT.

6. The method according to claim 1, wherein the configuration information identifies a configured grant for SDT.

7. The method according to claim 1, further comprising:

receiving further information identifying at least one of the at least one resource for performing the subsequent SDT.

8. A method performed by a radio access network node, the method comprising:

performing a procedure for small data transmission (SDT) with a user equipment (UE); and as part of the procedure, transmitting, while the UE is in the RRC inactive state and using a Medium Access Control (MAC) layer, configuration information relating to at least one resource for a subsequent SDT, wherein the configuration information is maintained in the UE when an SDT specific time alignment timer (SDT-TAT) expires.

9. A user equipment (UE) in Radio Resource Control (RRC) Inactive state, the UE comprising:

a transceiver; and a controller, wherein the controller is configured to:

initiate a procedure for small data transmission (SDT);

as part of the procedure, control the transceiver to receive, while the UE is in the RRC inactive state and using a Medium Access Control (MAC) layer, configuration information relating to at least one resource for a subsequent SDT;

maintain the configuration information from the MAC layer in the UE when an SDT specific time alignment timer (SDT-TAT) expires, and configure the subsequent small data transmission using the configuration information maintained in the UE.

10. A radio access network node, comprising:

a transceiver; and a controller, wherein the controller is configured to:

performing a procedure for small data transmission (SDT) with a user equipment (UE); and as part of the procedure, transmit, while the UE is in the RRC inactive state and using a Medium Access Control (MAC) layer, configuration information relating to at least one resource for a subsequent SDT, wherein the configuration information is maintained in the UE when an SDT specific time alignment timer (SDT-TAT) expires.

* * * * *